Jan. 26, 1960 R. E. ZOLLER 2,922,406
METHOD AND APPARATUS FOR GENERATING, SUPERHEATING, AND
REHEATING STEAM WITH STEAM TEMPERATURE CONTROL
BY SELECTIVE GAS RECIRCULATION
Filed Nov. 29, 1955 2 Sheets-Sheet 2
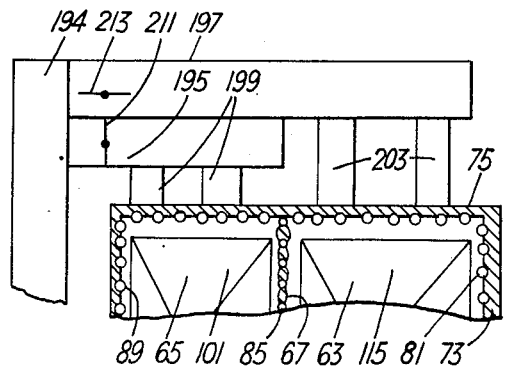
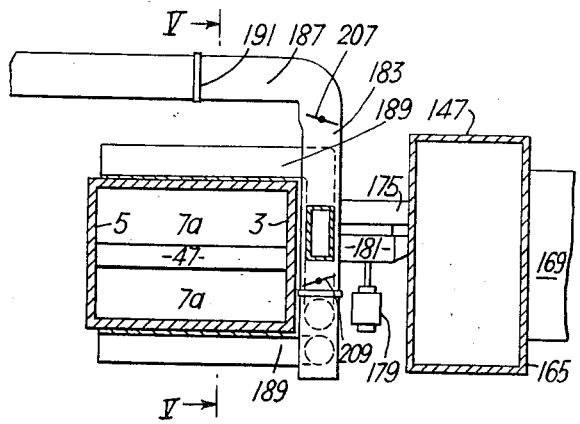
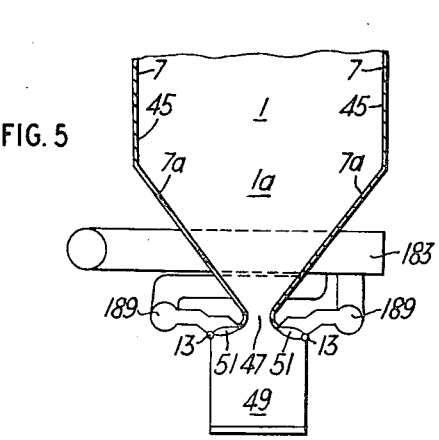
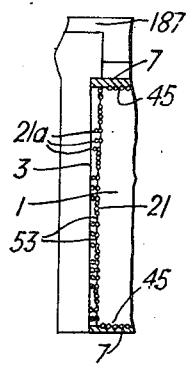
Inventor
Ronald Ernest Zoller
By *R. M. Holbrook*
Attorney United States Patent Office 2,922,406
Patented Jan. 26, 1960

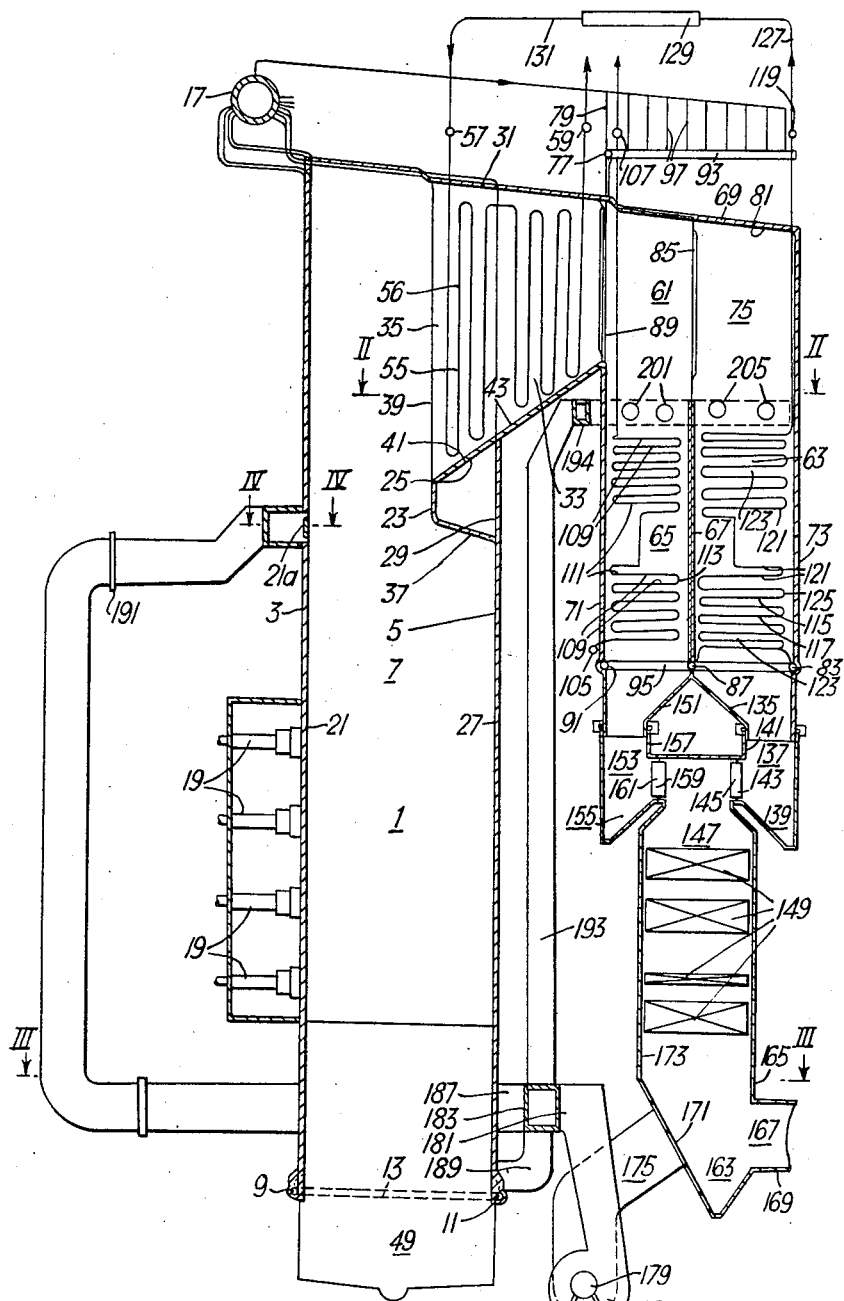

1

2,922,406

METHOD AND APPARATUS FOR GENERATING, SUPERHEATING, AND REHEATING STEAM WITH STEAM TEMPERATURE CONTROL BY SELECTIVE GAS RECIRCULATION

Ronald Ernest Zoller, London, England, assignor to The Babcock & Wilcox Company, New York, N.Y., a corporation of New Jersey Application November 29, 1955, Serial No. 549,814

Claims priority, application Great Britain December 2, 1954

14 Claims. (Cl. 122—478)

This invention relates to tubular vapor generating and vapor heating units of the kind having a gas recirculation system including means for recirculating gas cooled by contact with convection heat exchange surfaces of the unit in order to vary the ratio of heat absorbed in vapor heating to heat absorbed in vapor generation or/and in order to limit gas temperature within the furnace of the unit or at a region adjacent the outlet from the furnace. A unit of the kind in question is sometimes provided with parallel passes respectively containing superheating and reheating surfaces and fitted with damper means whereby the distribution of gas flow between the passes and, therefore, the degree of superheat and reheat over a wide range of loads may be controlled. In practice, however, the use of such damper means for the purpose of controlling superheat and reheat over a wide range of loads has the disadvantage that it increases the loading of the forced and induced draft fans since, upon a change in load, any increase of draft loss at the dampers has to be provided by the forced and induced draft fans.

In the gas recirculation system of a tubular vapor generating and vapor heating unit the gases dealt with by the fan are foul and the choice of fan is limited. One form of fan suitable for the service in question suffers from the defect that over a lower range of output the fan exerts a lower pressure than over a higher range of output. In service therefore it may happen that unless the fan speed is increased above the normal value the fan is unable to start gas recirculation. Provision for driving the fan above its normal speed entails undesirable expense.

The present invention includes a tubular vapor generating and vapor heating unit having a convection section including parallel gas passes respectively containing superheating surfaces and reheating surfaces and a gas recirculation system including means for recirculating gas cooled by contact with convection heat exchange surfaces of the unit in order to vary the ratio of heat absorbed in vapor heating to heat absorbed in vapor generation or/and in order to limit gas temperature within the furnace of the unit or at a region adjacent the outlet from the furnace, wherein the gas recirculation system includes additional means adapted to supply recirculated gas in controlled quantity exclusively to one of the parallel gas passes.

The invention also includes a tubular vapor generating and vapor heating unit having a gas recirculation system including means for recirculating gas cooled by contact with convection heat exchange surfaces of the unit in order to vary the ratio of heat absorbed in vapor generation or/and in order to limit gas temperature within the furnace of the unit or at a region adjacent the outlet from the furnace, wherein the gas recirculation system includes a recirculating fan the pressure exerted by which over a lower range of output is less than the pressure exerted over a higher range of output and the gas recirculation system includes additional means adapted to

2 return recirculated gas to a relatively low pressure region of the unit, the arrangement being such that, in the event of the fan pressure being insufficient to start gas recirculation to a relatively high pressure region of the unit, sufficient fan pressure can be developed by recirculating gas initially to the relatively low pressure region of the unit.

The invention further includes the method of regulating vapor temperature in a unit of the kind set forth which includes, in a lower range of loads, raising the temperature of superheated and reheated vapor by controllably recirculating gases to the furnace of the unit and raising the temperature of the reheated vapor relative to that of the superheated vapor by controllably recirculating gases to the parallel pass containing the vapor superheating surface, and, in an upper range of loads, reducing the temperature of the reheated vapor by controllably recirculating gases to the parallel pass containing the reheater surface and attemperating the superheated vapor to reduce any increase in temperature thereof occasioned by the recirculation of gases to the parallel pass containing the reheater surface.

The invention will now be described, by way of example, with reference to the accompanying, partly diagrammatic drawings, in which:

Figure 1 is a sectional side elevation of a tubular, vapor generating, superheating and reheating unit adapted to raise steam;

Figures 2, 3 and 4 are fragmentary sectional plan views taken respectively on the lines II—II, III—III and IV—IV of Fig. 1; and Figure 5 is a fragmentary, sectional front elevation taken on the line V—V of Figure 3 and looking in the direction indicated by the arrows.

The unit illustrated is one adapted to give a high output of steam at high pressure and high temperature of superheat and reheat and includes a vertically elongated furnace chamber 1 which has front, rear and side walls 3, 5 and 7 lined with steam generating, wall cooling tubes, which are suitably arranged in a circulatory system including lower headers, such as the headers 9, 11 and 13, and an upper steam and water drum 17 which includes steam and water separating means of known form and the water space of which is suitably connected to the lower headers of the circulatory system.

The front wall 3 of the furnace chamber 1 is vertical throughout its height and four vertically spaced horizontal rows of pulverized fuel burners 19 are arranged to discharge pulverized fuel entrained in a stream of combustion air into the furnace chamber between tubes 21 lining the wall 3 and towards the rear wall 5.

At some distance above the level of the uppermost row of burners 19, the rear wall 5 is formed with an arch 23 projecting forwardly and for approximately ⅓ of the depth of the furnace chamber and having an upper surface 25 which slopes upwardly and rearwardly. The rear wall 5 is lined with steam generating tubes 27 which at the base of the arch 23 divide into two groups, a first group 29 extending vertically upwards at the back of the arch to and through a roof 31, which roof extends rearwardly from the front wall 3 over the furnace chamber 1 and over a passage 33 leading rearwardly from a gas outlet 35 at the top of the furnace chamber 1, the tubes of the group 29 then extending to line that part of the roof 31 above the furnace chamber 1, forwardly to the front wall 3 and to the drum 17. A second group 37 of the tubes 27 lines the lower and forward surfaces of the arch 23 some of these tubes indicated at 39 extending upwardly from the forward end of the arch to the roof 31 to form a screen of spaced tubes which extends across the gas outlet 35, while the remainder indicated at 41 lining the upper surfaces of the arch 23, extend thereafter rearwardly and upwardly across a lower inclined surface 43 of the passage 33 and then vertically upwards in staggered array to the roof 31. All the tubes of the group 37 extend forwardly along the roof 31 to a point adjacent the wall 3 and then to the drum 17.

As shown in Figure 5, the side walls 7 of the furnace chamber 1 are for the most part vertical but each includes a lower part 7a which slopes inwardly and downwardly to form a hopper-shaped bottom part 1a of the furnace chamber 1.

Steam generating, wall cooling tubes 45 are incorporated in each side wall 7 and are connected at their lower ends to an inlet header 13 and at their upper ends to an outlet header (not shown).

An ash discharge slot 47 extends across a floor of the furnace chamber 1 between the adjacent lower edges of the side walls 7 and below the slot 47 is disposed a suitable ash collecting chamber 49 of known form. The lower ends of the tubes 45 are spaced apart to provide a row of ports 51 at each side of the chamber 1 for the discharge of recirculated gas to the chamber 49 and then through the slot 47 into the furnace chamber 1 remote from the gas outlet therefrom.

The front wall 3 of the furnace chamber 1 is formed across its width with a large number of ports 53 for the discharge of the recirculated gases, as will be described below, at the level of the lower surface of the arch 23, certain of the tubes 21 indicated in Figures 1 and 4 at 21a being bent forwardly out of the plane of the wall 3 to provide the ports 53.

Disposed within the passage 33 are the heat exchange surfaces of a secondary convection superheater 55 comprising a large number of sinuously bent, nested tubes each connected at one end to an inlet header 57 and at the other end to an outlet header 59, the headers 57 and 59 being disposed above the roof 31. For simplicity, the tubes of a tube nest are shown in Figure 1 as a single tube 56.

Beyond the rearward end of the passage 33 is a gas turning chamber 61 disposed above vertical, parallel downpasses 63 and 65 separated by wall means in the form of a division wall 67 which extends in a direction parallel to the plane of the front wall 3 so that the down pass 63 is on that side of the down pass 65 remote from the furnace chamber 1. A roof 69 of the chamber 61, a side wall 73 of the down pass 63, a side wall 71 of the downpass 65, a division wall 67 and opposite side walls such as the side wall 75, which extends throughout the depth of the passes 63 and 65, are formed upon a cage of steam superheating, gas cooling tubes. Thus a steam inlet header 77 disposed above the roof 31 and connected by pipes such as the pipe 79 to the steam space of the drum 17, is connected by tubes 81 which line the roof 69 and the wall 73 to a first transfer header 83 disposed at the foot of the wall 73; tubes 85 extend from the inlet header 77 to line part of the roof 69 extend downwardly through the chamber 61 where they are disposed in staggered array to permit gas flow therebetween, form the basis of the division wall 67 and are connected at their lower ends to a second transfer header 87 disposed at the foot of the division wall 67; further tubes 89 connected at their upper ends to the inlet header 77 extend downwardly across the rear end of the passage 33 to line the side wall 71 and are connected to a third transfer header 91 disposed at the foot of the wall 71; other tubes (not detailed) connected at their upper ends to a steam inlet header 93, itself connected to and disposed at the same level as the inlet header 77 but extending rearwardly at right angles to that header line the outer wall 75 and are connected at their lower ends to a fourth transfer header 95 at the foot of the wall 75; and further tubes (not detailed) connected at their upper ends to a steam inlet header (not shown) arranged parallel to the header 93 and connected to the header 77 line the outer wall which extends throughout the depth of the passes 63 and 65 opposite to the wall 75 and are connected at their lower ends to a fifth transfer header (not shown) arranged parallel to the header 95. The header 93 and the similar parallel inlet header are connected by pipes such as the pipes 97 with the steam space of the drum 17. The spaces between adjacent tubes in each wall of the cage are filled with refractory material, in order to provide gas-tight walls, except as specifically mentioned above. The five transfer headers are interconnected by suitable piping (not detailed). Suitably, the tubes forming the superheater cage are of 2½" outside diameter and, except where specifically mentioned, disposed at a pitch of 7".

Disposed within the forward down pass 65 is a tubular convection steam reheater 101 comprising a large number of sinuously bent nested tubes each nest being shown, for simplicity, in Figure 1 as only a single tube 103 connected at its lower end to an inlet header 105 disposed forwardly of the side wall 71 and at its upper end to an outlet header 107 disposed above the roof 69. In rising to a level somewhat below the top of the division wall 67 each tube 103 is arranged to include a large number of horizontal tube lengths 109 disposed in two banks 111, adjacent horizontal tube lengths 109 being connected by return bends such as the return bend 113. Adjacent horizontal tube lengths 109 of the banks 111 are, for example, spaced apart across the width of the pass 65 at a pitch of 6" each of the tubes 103 being of 2½" outside diameter.

Disposed within the rearward gas down pass 63 is a tubular convection, primary superheater 115 comprising a large number of sinuously bent nested tubes each nest being shown, for simplicity, in Figure 1 as only a single tube 117 connected at its lower end either to the header 83 or the header 87, and at its upper end to an outlet header 119, in rising to a level somewhat below the top of the division wall 67 each tube 117 is arranged to include a large number of horizontal tube lengths 121 disposed in two spaced tube banks 123 respectively opposite the reheater tube banks 111, adjacent horizontal tube lengths 121 in each bank 123 being connected by return bends such as the return bend 125. Above the level of the top of the division wall 67 each tube 117 extends vertically adjacent the side wall 73 above which it is connected to the outlet header 119. The tubes 121 are, for example, of 2½" outside diameter, the horizontal tube lengths 121 of adjacent tubes being spaced across the width of the down pass 63 at a pitch of 6".

The outlet header 119 is connected by appropriate pipes such as the pipe 127 to a spray attemperator 129 which in turn is connected by suitable pipes such as the pipe 131 to the inlet header 57 of the secondary convection superheater 55.

Each of the reheater tube banks 111 is supported, in known manner, by the tubes 89 of the wall 71 and the tubes 85 of the wall 67, while each of the superheater tube banks is supported, in known manner, by the tubes 81 of the side wall 73 and the tubes 85 of the wall 67. Below the down pass 63 is arranged a surface 135 sloping rearwardly and downwardly from the foot of the division wall 67 to a short vertical duct 137 the bottom of which is shaped to provide a hopper 139 for the collection of ash particles removed from the superheater tubes 117 during cleaning thereof. The forward wall 141 of the duct 137 is formed with a gas outlet 143 fitted with pre-set dampers 145 respectively rotatable about vertical axes and leading to the top of a downpass 147 containing sections 149 of an economizer. In a similar manner below the down pass 65 is arranged a surface 151 sloping forwardly and downwardly from the foot of the division wall 67 to a short vertical duct 153, the bottom of which is shaped to provide a hopper 155 for the collection of ash particles removed from the reheater tubes 103 during cleaning thereof. The rearward wall 157 of the duct 153 is formed with a gas outlet 159 fitted with pre-set dampers 161 and leading to the top of the down pass 147. The bottom of the down pass 147 is formed to provide a hopper 163 and, above the hopper 163, a side wall 165 of the downpass 147 is formed with a port 167 leading to a laterally extending duct 169 for the conveyance of gaseous products of combustion to an air heater, an induced draft fan and a chimney (not shown), the air heater being associated with a forced draft fan and suitable ducting for the supply of primary and secondary air.

At the level of the port 167 a lower, rearwardly and downwardly inclined part 171 of a side wall 173 of the downpass 147 opposite the side wall 165 thereof is formed with a port which affords communication between the downpass 147 and a duct 175 which leads to the inlet of a gas recirculation fan 177 having an electric motor 179 and arranged to discharge gases withdrawn from the pass 147 through a duct 181 into a manifold 183 which is arranged to supply recirculated gases to branch ducts 187 and 189 respectively connected to the ports 53 in the front wall 3 of the furnace chamber 1 and the ports 51 at the upper end of the ash collecting chamber 49. The branch duct 187 includes suitable expansion joints 191 adapted to accommodate thermal expansions of parts of that duct.

An additional branch duct 193 extends vertically upwardly from the manifold 183 between the rear wall 5 of the furnace chamber 1 and the side wall 71 of the downpass 65 to the level of the upper end of the division wall 67 between the passes 63 and 65. The branch duct 193 leads through a lateral extension 194 at its upper end to two ducts 195 and 197, the duct 195 communicating by way of conduits 199 with ports 201 formed in the side wall 75 of the pass 65 and the duct 197 communicating by way of conduits 203 with ports 205 opening into the downpass 63 through the side wall 75. It will be appreciated that in units having passes such as the passes 63 and 65 of substantial width provision may, with advantage, be made for discharging recirculated gases through ports formed in opposite side walls of those passes so as to limit stratification of the recirculated gases and the hotter gases flowing from the furnace chamber to the passes 63 and 65.

Gas flow controlling dampers 207 and 209 are so disposed in manifold 183 that recirculated gases may selectively be supplied to the ports 51 and 53. To this end the damper 207 is arranged to control the flow of recirculated gases to the branch duct 187, whilst the damper 209 is arranged to control the admission of recirculated gases to the branch ducts 189. Further flow controlling dampers 211 and 213 are respectively disposed in the ducts 195 and 197 so as to permit selective gas recirculation to the downpasses 63 and 65 by way of the ports 201 and 205.

During operation of the unit described, pulverized fuel entrained in a stream of primary air is supplied to the burners 19, and secondary air is supplied from a windbox associated with the burners 19 and hot gaseous products of combustion rise in the furnace chamber 1 and flow through the passage 33 to the gas turning chamber 61 beyond which the hot gases divide into two streams passing down the downpasses 63 and 65 respectively and rejoin in the upper end of the downpass 147 and then flow downwardly through that downpass and through the duct 169 or duct 175.

A mixture of steam and water rises in the wall tubes of the furnace chamber 1 and enters the drum 17 from which saturated steam flows by way of pipes 79 and 97 to the respective inlet headers 77 and 93 of the cage of superheating tubes upon which the gas turning chamber 61 and the downpasses 63 and 65 are based. After passing downwardly through the tubes of the cage the steam reaches the transfer headers 83 and 87 from which it flows upwardly through the tubes of the primary superheater 115 to the outlet header 119 thence by way of pipe 127 to the spray attemperator 129 where the degree of superheat may be moderated. From the attemperator, the superheated steam flows through pipe 131 to the inlet header 57 of the secondary superheater 55 and through that superheater to the outlet header 59 thereof, whence it passes to a steam turbine supplied by the unit.

Steam leaving the high pressure stage of the turbine is returned for reheating to the unit and enters the reheater inlet header 105, passes upwardly through the tubes of the reheater 101 to the outlet header 107 and returns thence to a low pressure stage of the turbine.

When operating at low loads, due to throttling of the steam to the turbine a relatively high degree of reheating is required. It follows that, as compared with the degree of superheating required, less reheating is needed at higher loads than at lower loads and conversely. A convection reheater, however, gives a rising temperature load characteristic. At higher loads, therefore, the temperature of reheat must be limited. Such limitation may be effected by delivering in controlled fashion recirculated gases to the reheater downpass 65 through the duct 193 and duct 195 and thence through the conduits 199 and ports 201. In this manner the mean temperature of the gas flowing through the reheater pass 65 is reduced so that the heat transfer to the vapor flowing through the reheater 101 is lessened to appropriate degree and the desired temperature of reheat is obtained. The flow of recirculated gases to the reheater pass 65 is effected by opening the damper 211, the damper 213 being in the closed position. There occurs, therefore, through the primary superheater pass 63 an increased flow of gases the temperature of which has not been reduced by recirculated gases introduced to the top of the primary superheater pass 63. The final temperature of superheat, therefore, tends to rise but is limited to a desired value by the appropriate degree of attemperation.

The operative conditions here considered involve the increase in flow of the steam to the turbine. In other words, the unit is operating under increasing load, or rate of steam consumption. Usually the rate of steam generation increases simultaneously with the rate of steam consumption, and under these conditions the temperature of the reheated steam would tend to rise faster than the rise in the temperature of the superheated steam. This is corrected by increasing the flow of recirculated gases from the fan 177 through the ports or openings 201 in the reheater gas pass. These recirculated gases enter the reheater gas pass at a temperature so much below the temperature of the unrecirculated gases that the thermal effect of this decreased temperature more than offsets any increase in heat input to the reheater resulting from the increase in gas mass flow over the reheater. This introduction of recirculated gases through the ports 201 increases the resistance of the reheater gas pass to flow of gases from the furnace to the economizer 149, and this increase in resistance causes more of the gases from the furnace 1 to pass through the primary reheater gas pass 63. This action may cause the superheat temperature to increase above its predetermined value, and if that happens, the spray attemperator 129 is operative to reduce the superheat temperature to the predetermined or optimum value.

On the other hand, as the load falls from full load and the temperatures of superheat and reheat fall, the temperature of reheat tending to fall more rapidly than that of superheat, recirculated gases are introduced in controlled quantity into the furnace chamber by appropriate opening of the damper 209 so as to depress the temperature in the chamber 1 and thereby increase the proportion of the total heat which is available for vapor heating. In this manner the superheat and reheat temperatures are increased. Moreover, since over a load range below full load the temperature of reheat is too low, recirculated gases are introduced into the top of the parallel pass 63 containing the primary superheater by way of the ports 205 by opening the damper 213, the damper 211 being in the closed position. In this way an increased proportion of the gases flowing to the downpasses 63 and 65 from the furnace chamber 1 traverses the reheater downpass 65 and the temperature of reheat relative to that of superheat is accordingly raised.

At loads in the neighborhood of full load recirculated gases may be delivered by way of the duct 187 and ports 53 to an upper region of the furnace chamber 1 in order that gas temperature at the outlet of the furnace chamber may be limited for the purpose of avoiding deposits of slag in sticky condition on or overheating of the tubes of the secondary superheater 55 or/and for the purpose of effecting a reduction of the proportion of the total heat utilized in effecting superheating and reheating.

If it is desired to start recirculation to the furnace chamber 1 when the pressure drop between the ash collecting chamber 49 or the region of the furnace chamber 1 adjacent the ports 53 and the lower end of the economizer downpass 147 is greater than the pressure developed by the fan 177, the fan may be started up whilst the dampers 209 and 207 are closed, one or both of the dampers 211 and 213 being open. In this manner gas recirculation takes place through the fan 177 and to one or both of the passes 63 and 65 and the pressure developed by the fan becomes sufficiently great to deliver gas to the furnace chamber 1 through the ports 51 or 53, whereupon the damper 207 or/and the damper 209 may be opened to permit flow to the furnace chamber 1 of recirculated gases at a desired rate. The damper 211 or/and damper 213 may then be closed or adjusted to permit appropriate recirculation of gas to one of the parallel passes 63 and 65.

In the arrangement described above, the proportioning of gas flow between the parallel passes 63 and 65 is achieved without adjustment of the pre-set dampers 145 and 161. However minor adjustments of the dampers 145 and 161 may at times be desirable in order to vary the relative temperatures of reheat and superheat. Moreover, notwithstanding a deficiency in the fan pressure at zero output, gas recirculation to the furnace chamber may be initiated without recourse to an abnormally high fan speed.

While in accordance with the provisions of the statutes I have illustrated and described herein the best form of the invention known to me, those skilled in the art will understand that changes may be made without departing from the spirit of the invention covered by my claims, and that certain features of my invention may sometimes be used to advantage without a corresponding use of other features.

What is claimed is:

1. In a vapor generating, superheating and reheating unit; means forming an elongated furnace chamber; fuel burning means supplying the furnace chamber with high temperature combustion gases near one end of the furnace chamber; means providing a main gas pass leading from the gas exit at the end of the furnace chamber remote from the fuel burning means; means providing a plurality of parallel secondary gas passes each conducting gases from the gas outlet of the main gas pass; means providing a convection vapor heater in the main gas pass; means providing a convection vapor reheater in one of the parallel passes; means providing a convection superheater in another of the parallel passes; and a gas recycling system including a recycled gas fan and fan inlet duct-work leading from a position in the gas flow path downstream of the superheater, and fan outlet duct-work with branches leading respectively to three positions with one position near the beginning of the gas flow path, a second position intermediate the length of the gas flow path, and a third position near the end of the gas flow path and upstream of the parallel gas passes; the gas recycling system including means for selectively increasing the proportion of total recycled gas flow to any one of said positions and means to selectively proportion the gas flow between the parallel passes to maintain vapor superheat and reheat at a predetermined value or values and to provide for the initiation of flow of recycled gases into said gas flow path under conditions ranging over a wide rate of vapor generation.

2. In a vapor generating, superheating and reheating unit; means including vapor generating wall tubes forming an elongated furnace chamber with a hopper bottom; fuel burning means supplying the furnace chamber with high temperature combustion gases at a position near one end of the furnace chamber; means providing a main gas pass leading from the gas exit at the end of the furnace chamber remote from the fuel burning means; means providing a plurality of parallel secondary gas passes each conducting gases from the gas outlet of the main gas pass; means providing a secondary convection vapor superheater in the main gas pass; means providing a convection vapor reheater in one of the parallel passes; means providing a primary convection superheater in another of the parallel passes; means co-acting with said furnace chamber, the main gas pass and the parallel gas passes to provide a long gas flow path with a substantial difference in the gas pressures at the opposite ends of that gas flow path; means attemperating the superheated vapor as it flows from the primary superheater to the secondary superheater; and a gas recycling system including a recycled gas fan and fan inlet duct-work leading from a position in the gas flow path downstream of the primary superheater, and fan oulet duct-work with branches leading respectively to three positions with one position through the hopper bottom and near the beginning of the gas flow path, a second position intermediate the length of the gas flow path, and a third position near the end of the gas flow path and upstream of the parallel gas passes; the gas recycling system including means for selectively increasing the proportion of total recycled gas flow to any one of said positions and means to selectively proportion the gas flow between the inlets of the parallel passes to maintain vapor superheat and reheat at a predetermined value or values and to provide for the initiation of flow of recycled gases into said gas flow path under conditions ranging over a wide rate of vapor generation.

3. In a vapor generating, superheating and reheating unit; means including vapor generating wall tubes forming a vertically elongated furnace chamber having a hopper bottom; fuel burning means normally supplying the furnace chamber with high temperature combustion gases near the lower end of the furnace chamber; means providing a main gas pass leading from the gas exit at the upper end of the furnace chamber remote from the fuel burning means; said last named means including an arch extending into the furnace chamber; means providing a plurality of parallel secondary gas passes each conducting gases from the gas outlet of the main gas pass; means providing a secondary convection vapor superheater in the main gas pass; means providing a convection vapor reheater in one of the parallel passes; means providing a primary convection superheater in another of the parallel passes; means co-acting with said furnace chamber, the main gas pass and the parallel gas passes to provide a long flas flow path with a substantial difference in gas pressures at the opposite ends of that gas flow path; liquid injection means attemperating the superheated vapor as it flows from the primary superheater to the secondary superheater; and a gas recycling system including a recycled gas fan and fan inlet duct-work leading from a position in the gas flow path downstream of the primary superheater and fan outlet duct-work with branches leading respectively to three positions with one position in the hopper bottom and near the beginning of the gas flow path, a second position intermediate the length of the gas flow path and opposite said arch, and a third position near the end of the gas flow path and upstream of the parallel gas passes; the gas recycling system including means for selectively increasing the proportion of total recycled gas flow to any one of said positions, and means to selectively proportion the gas flow between the parallel passes to maintain vapor superheat and reheat at a predetermined value or values and to provide for the initiation of flow recycled gases into said gas flow path under conditions ranging over a wide range of vapor generation.

4. In a vapor generating, vapor superheating and vapor reheating unit; a vertically elongated furnace chamber having walls including vapor generating tubes and forming a hopper bottom; fuel burning means firing the furnace chamber at a position intermediate its height; gas pass forming means providing a main gas pass leading from the furnace chamber at its upper portion; said gas pass means including an arch projecting inwardly of the furnace chamber with the upper part of the arch forming a part of the gas pass; a secondary convection superheater disposed within said main gas pass; means forming parallel flow gas passes having their inlets leading from the gas outlet of the main gas pass; a primary superheater in one of the parallel flow passes; a convection heated vapor reheater disposed within the other parallel flow gas pass; means causing the combustion gases to flow in a long gas flow path from the fuel burning means to a position beyond the outlets of the parallel gas passes; a recycled gas system including a recycled gas fan, fan inlet duct work having its inlet communicating with said gas flow path downstream of said parallel gas passes, and recycled gas fan outlet duct work communicating with the gas flow at three positions widely spaced along that path; one of said positions being adjacent the beginning of the gas flow path, another at the inlets of the parallel gas flow paths, and a third position directly opposite said arch; means for proportioning the flow of recycled gases between said three positions dependent upon load and steam temperatures; and an additional means for proportioning the flow of recycled gases between said parallel gas passes.

5. In a vapor generating, vapor superheating and vapor reheating unit; a vertically elongated furnace chamber having walls including vapor generating tubes and forming a hopper bottom; fuel burning means firing the furnace chamber at its lower portion; gas pass forming means providing a main gas pass leading from the furnace chamber at its upper portion; said gas pass means including an arch projecting into the furnace chamber from its wall opposite the fuel burning means with the upper part of the arch forming a part of the floor of the gas pass; a secondary convection superheater disposed within said main gas pass; means forming parallel flow gas passes having their inlets leading from the gas outlet of the main gas pass; a primary convection superheater in one of the parallel flow passes; a convection heated vapor reheater disposed within the other parallel flow gas pass; means causing the combustion gases to flow in a long gas flow path from the fuel burning means to a position beyond the outlets of the parallel gas passes; and a recycled gas system including a recycled gas fan, fan inlet duct work having its inlet communicating with said gas flow path downstream of the parallel gas passes; and recycled gas fan outlet duct work communicating with the gas flow at three positions widely spaced along that path; one of said positions being adjacent the beginning of the gas flow path and in the hopper bottom, another at the inlets of the parallel gas flow paths; and a third position directly opposite said arch; means for proportioning the flow of recycled gases between said three positions dependent upon load and steam temperatures; and an additional means for proportioning the flow of recycled gases between said parallel gas passes to maintain reheat temperature in step with superheat temperature over a wide range of load or rate of steam generation.

6. In a steam generating, vapor superheating and vapor reheating unit of the water tube type; a vertically elongated furnace chamber having walls including steam generating tubes and forming a hopper bottom; fuel burning means firing the furnace chamber along one wall and at level intermediate the height of the chamber, gas pass forming means providing a main gas pass leading from the furnace chamber at its upper portion; said gas pass means including an arch projecting into the furnace chamber from the chamber wall opposite the fuel burning means with the upper part of the arch forming a part of the floor of the gas pass; a secondary convection steam superheater receiving the generated steam and disposed within said main gas pass; means forming parallel gas passes having their inlets leading from the gas outlet of the main gas pass; a primary steam superheater in one of the parallel passes; a convection heated steam reheater disposed within the other parallel gas pass; means causing the combustion gases to flow in a long gas flow path leading from a position near the fuel burning means to a position beyond the outlets of the parallel gas passes; a recycled gas system including a recycled gas fan, fan inlet duct work having its inlet communicating with said gas flow path downstream of the parallel gas passes; and recycled gas fan outlet duct work communicating with the gas flow path and introducing recycled gases into the gas flow of said path selectively at at least one of three positions widely spaced along that path; one of said positions being adjacent the beginning of the gas flow path, another at the inlets of the parallel gas flow paths; and a third position directly opposite said arch; means for proportioning the flow of recycled gases between said three positions dependent upon load and heated steam temperatures; an additional means for proportioning the flow of recycled gases between said parallel gas passes.

7. In a method of generating steam at high pressures and temperatures and maintaining reheated steam temperature and superheated steam temperature at a predetermined value or values over a wide range of loads; said method comprising the burning of fuel at a position near the beginning of a long gas flow path; generating steam by radiantly transmitting heat to enclosed streams of a vaporizable liquid in an attenuated combustion zone and steam generating zone; effecting secondary superheating of the generated steam in a convection heat transfer zone subject to the flow of gases from the combustion zone; dividing the gas flow from the said convection superheating zone into parallel gas flows; effecting low temperature superheating of the steam in one of said parallel gas flows by convection heat transfer; effecting the reheating of the generated steam by convection heat transfer in another of the parallel gas flows; recycling a percentage of the combined gas flow from said parallel gas flows controllably and selectively to at least one of three positions; the first of said positions leading to the combustion zone upstream of the fuel burning; the second of said positions leading to the gas inlet of the secondary superheating zone, and the third position leading to the inlets of the parallel gas flows; attemperating the steam from the primary superheating zone on its way to the secondary superheating zone; and selectively proportioning between the parallel gas flows the total gases received at the inlets of said gas flows; to initiate and maintain optimum recycled gas flow and to maintain superheated steam temperature, reheated steam temperature at a predetermined value or values.

8. In a method of generating steam at high pressures and temperatures and maintaining reheated steam temperature and superheated steam temperature at a predetermined value or values over a wide range of loads; said method comprising the burning of fuel at a position near the beginning of a long gas flow path; generating steam in an initial part of the gas flow path by radiantly transmitting heat to enclosed streams of a vaporizable liquid in an attenuated combustion zone and steam generating zone; effecting secondary superheating of the generated steam in a heat transfer zone subject to the flow of gases from the combustion zone; dividing the gas flow from the said convection superheating zone into parallel gas flows; effecting low temperature superheating of the steam in one of said parallel gas flows by convection heat transfer; effecting the reheating of the generated steam by convection heat transfer in another of the parallel gas flows; recycling a percentage of the combined gas flow from said parallel gas flows controllably and selectively to at least one of three positions; the first of said positions leading to the combustion zone upstream of the fuel burning; the second of said positions leading to the gas inlet of the secondary superheating zone, and the third position between the primary and secondary superheating zones and leading to the inlets of the parallel gas flows; spray attemperating the steam from the primary superheating zone on its way to the secondary superheating zone; and selectively proportioning between the parallel gas flows the total gases received at the inlets of said gas flows; to initiate and maintain optimum recycled gas flow and to maintain superheated steam temperature, reheated steam temperature at a predetermined value or values.

9. In a method of generating steam at high pressures and temperatures and maintaining reheated steam temperature and superheated steam temperature at a predetermined value or values over a wide range of loads or rate of steam generation; said method comprising the burning of fuel in a zone near the beginning of a long combustion gas flow path; generating steam in an initial part of the gas flow path by radiantly transmitting heat to enclosed streams of a vaporizable liquid in an attenuated combustion zone and steam generating zone; effecting secondary superheating of the generated steam in a convection heat transfer zone subject to the flow of gases from the combustion zone; said convection zone constituting a substantial part of the long gas flow path; dividing the gas flow from the said convection superheating zone into parallel gas flows; effecting low temperature convection primary superheating of the steam in one of said parallel gas flows by convection heat transfer; conducting steam from the outlet of the primary zone to the secondary zone; effecting the reheating of the generated steam by convection heat transfer in another of the parallel gas flows; recycling a percentage of the combined gas flow from said parallel gas flows controllably and selectively to at least one of three positions; the first of said positions leading to the high gas pressure combustion zone upstream of the fuel burning, the second of said positions leading to the lower gas pressure gas inlet of the secondary superheating zone, and the third position at a lower gas pressure zone between the primary and secondary superheating zones and leading to the inlets of the parallel gas flows; spray attemperating the steam from the primary superheating zone on its way to the secondary superheating zone; and selectively proportioning between the parallel gas flows the total gases received at the inlets of said gas flows; to initiate and maintain optimum recycled gas flow and to maintain superheated steam temperature, reheated steam temperature at a predetermined value or values.

10. In a vapor generating and vapor heating unit comprising walls including vapor generating tubes defining a furnace chamber arranged to receive heating gases in one end portion thereof and having a heating gas outlet at its opposite end portion, a pair of parallel convection gas passes communicating with said gas outlet and arranged to received heating gases flowing from said furnace, a superheater disposed in one of said parallel gas passes, a reheater disposed in the other of said parallel gas passes, and a gas recirculation system for controlling superheater and reheater vapor temperatures over a wide load range, the method of operation which comprises withdrawing low temperature heating gases from a position downstream gas-wise of said parallel gas passes, controlling the amount of heat absorption of the vapor generating tubes of said furnace chamber and thereby the amount of convection vapor superheating and reheating over a predetermined fractional load range of the unit by introducing withdrawn gases into said one end portion of the furnace chamber so as to mix with the heating gases flowing through said chamber, controlling the gas temperature in the opposite end portion of said furnace chamber over a predetermined range of loads by introducing withdrawn gases into the opposite end portion of said chamber at a level adjacent to said gas outlet, introducing withdrawn gases directly into the gas inlet end of said one parallel gas pass over a predetermined lower range of loads so as to mix with the heating gases flowing to said superheater, and introducing withdrawn gases directly into the gas inlet end of said other parallel gas over a predetermined upper range of loads so as to mix with the heating gases flowing to said reheater.

11. In a vapor generating and vapor heating unit comprising walls including vapor generating tubes defining a vertically elongated furnace chamber arranged to receive heating gases in the lower portion thereof and having a heating gas outlet at its upper end, a pair of parallel convection gas passes communicating with said gas outlet and arranged to receive heating gases flowing from said furnace, a superheater disposed in one of said parallel gas passes, a reheater disposed in the other of said parallel gas passes, and a gas recirculation system for controlling superheater and reheater vapor temperatures over a wide load range, the method of operation which comprises withdrawing low temperature heating gases from a position downstream gaswise of said parallel gas passes, controlling the amount of heat absorption of the vapor generating tubes of said furnace chamber and thereby the amount of convection vapor superheating and reheating over a predetermined fractional load range of the unit by introducing withdrawn gases into said lower portion of the furnace chamber so as to mix with the heating gases flowing through said chamber, controlling the gas temperature in the upper portion of said furnace chamber over a predetermined upper range of loads by introducing withdrawn gases into the upper portion of said furnace chamber at a level adjacent to said gas outlet, introducing withdrawn gases directly into the gas inlet end of said one parallel gas pass over a predetermined lower range of loads so as to mix with the heating gases flowing to said superheater, and introducing withdrawn gases directly into the gas inlet end of said other parallel gas pass over a predetermined upper range of loads so as to mix with the heating gases flowing to said reheater.

12. A vapor generating and vapor heating unit comprising walls including vapor generating tubes defining a furnace chamber arranged to receive heating gases in one end portion thereof and having a heating gas outlet at its opposite end portion, means defining a pair of convection heating parallel gas passes communicating with said gas outlet and each having an inlet arranged to receive heating gases flowing from said furnace, a bank of vapor superheating tubes in one of said parallel gas passes, a bank of vapor reheating tubes in the other of said parallel gas passes, means for withdrawing heating gases from a position downstream gas-wise of said parallel gas passes and introducing some of the withdrawn gases into said one end portion of the furnace chamber, means for introducing some of the withdrawn gases into the opposite end portion of said furnace chamber at a level adjacent to said gas outlet, and means for introducing some of the withdrawn gases directly and selectively into the gas inlet end of each of said parallel gas passes.

13. A vapor generating and vapor heating unit comprising walls including vapor generating tubes defining a vertically elongated furnace chamber arranged to receive heating gases in the lower portion thereof and having a heating gas outlet at its upper end, means defining a pair of convection heating parallel gas passes communicating with said gas outlet and each having an inlet arranged to receive heating gases flowing from said furnace, a bank of vapor superheating tubes in one of said parallel gas passes, a bank of vapor reheating tubes in the other of said parallel gas passes, means for withdrawing heating gases from a position downstream gaswise of said parallel gas passes and introducing some of the withdrawn gases into the lower portion of said furnace chamber, means for introducing some of the withdrawn gases into the upper portion of said furnace chamber at a level adjacent to said gas outlet, and means for introducing some of the withdrawn gases directly and selectively into the gas inlet end of each of said parallel gas passes.

14. A vapor generating and vapor heating unit comprising walls including vapor generating tubes defining a vertically elongated furnace chamber arranged to receive heating gases in the lower portion thereof and having a heating gas outlet at its upper end, means defining a convection heating gas passage opening at one end to said gas outlet, a bank of secondary vapor superheating tubes in said gas passage, means defining a pair of convection heating parallel gas passes communicating with the opposite end of said gas passage and each having an inlet arranged to receive heating gases flowing from said gas passage, a bank of primary vapor superheating tubes in one of said parallel gas passes and connected for series flow of vapor to said bank of secondary vapor superheating tubes, a bank of vapor reheating tubes in the other of said parallel gas passes, means for withdrawing heating gases from a position downstream gaswise of said parallel gas passes and introducing some of the withdrawn gases into the lower portion of said furnace chamber, means for introducing some of the withdrawn gases into the upper portion of said furnace chamber at a level adjacent to said gas outlet, and means for introducing some of the withdrawn gases directly and selectively into the gas inlet end of each of said parallel gas passes.

References Cited in the file of this patent
UNITED STATES PATENTS

| | | |
|---|---|---|
| 1,929,890 | Huet | Oct. 10, 1933 |

FOREIGN PATENTS

| | | |
|---|---|---|
| 109,830 | Australia | Feb. 14, 1940 |
| 514,687 | Belgium | Oct. 31, 1952 |
| 525,796 | Belgium | Feb. 15, 1954 |
| 1,085,964 | France | Aug. 4, 1954 |